United States Patent
Brulotte

(10) Patent No.: US 11,889,162 B2
(45) Date of Patent: Jan. 30, 2024

(54) MEDIA CONTENT DELIVERY SELECTION

(71) Applicant: DISH Technologies L.L.C., Englewood, CO (US)

(72) Inventor: Kristopher Brulotte, Parker, CO (US)

(73) Assignee: DISH Technologies L.L.C., Englewood, CO (US)

( * ) Notice: Subject to any disclaimer, the term of this patent is extended or adjusted under 35 U.S.C. 154(b) by 233 days.

(21) Appl. No.: 16/891,820

(22) Filed: Jun. 3, 2020

(65) Prior Publication Data

US 2020/0296479 A1 Sep. 17, 2020

Related U.S. Application Data

(63) Continuation of application No. 14/945,454, filed on Nov. 19, 2015, now abandoned.

(51) Int. Cl.
| | |
|---|---|
| H04N 21/81 | (2011.01) |
| H04N 21/433 | (2011.01) |
| H04N 21/235 | (2011.01) |
| H04N 21/84 | (2011.01) |
| H04N 21/454 | (2011.01) |
| H04N 21/8352 | (2011.01) |
| H04N 21/2668 | (2011.01) |
| H04N 21/4627 | (2011.01) |

(52) U.S. Cl.
CPC ..... *H04N 21/8133* (2013.01); *H04N 21/2353* (2013.01); *H04N 21/2668* (2013.01); *H04N 21/433* (2013.01); *H04N 21/454* (2013.01); *H04N 21/4627* (2013.01); *H04N 21/8352* (2013.01); *H04N 21/84* (2013.01)

(58) Field of Classification Search
None
See application file for complete search history.

(56) References Cited

U.S. PATENT DOCUMENTS

| | | |
|---|---|---|
| 6,745,391 B1 | 6/2004 | Macrae et al. |
| 6,993,722 B1 | 1/2006 | Greer et al. |
| 7,921,441 B2 | 4/2011 | Macrae et al. |
| 8,151,293 B1 | 4/2012 | Kolde et al. |
| 8,531,612 B1 | 9/2013 | Shintani |
| 8,997,148 B2 | 3/2015 | Macrae et al. |
| 9,015,755 B2 | 4/2015 | Gupta et al. |
| 2003/0084446 A1* | 5/2003 | Thurston ............ H04N 21/4826 348/731 |
| 2004/0154040 A1 | 8/2004 | Ellis |
| 2006/0242665 A1 | 10/2006 | Knee et al. |
| 2008/0216122 A1* | 9/2008 | Pong ..................... H04N 21/47 725/37 |
| 2010/0031162 A1 | 2/2010 | Wiser et al. |
| 2010/0235351 A1 | 9/2010 | Iwasa et al. |
| 2010/0332988 A1* | 12/2010 | Fong ................ H04N 21/47815 715/727 |
| 2011/0060649 A1 | 3/2011 | Dunk et al. |
| 2013/0133022 A1 | 5/2013 | Bi et al. |

(Continued)

*Primary Examiner* — Jason K Lin
(74) *Attorney, Agent, or Firm* — Kilpatrick Townsend & Stockton LLP

(57) ABSTRACT

A device, such as for example and without limitation, a set-top box, is programmed to receive metadata relating to available media content. At least one item of media content is identified as selected to be provided to a display upon activation of the display. The at least one item of selected media content is provided to the display upon activation of the display.

19 Claims, 2 Drawing Sheets

(56) References Cited

U.S. PATENT DOCUMENTS

| | | |
|---|---|---|
| 2013/0205312 A1 | 8/2013 | Huang |
| 2013/0239163 A1 | 9/2013 | Kim et al. |
| 2014/0002576 A1 | 1/2014 | Kaza et al. |
| 2014/0089953 A1* | 3/2014 | Chen ................ H04N 21/8126 707/723 |
| 2014/0123006 A1 | 5/2014 | Chen et al. |
| 2014/0358970 A1 | 12/2014 | Morris et al. |
| 2015/0189392 A1* | 7/2015 | MacRae ............ H04N 21/4316 725/27 |
| 2016/0127783 A1* | 5/2016 | Garcia Navarro ........................ H04N 21/4532 725/34 |
| 2016/0360271 A1* | 12/2016 | Magahern ................ G06F 9/48 |
| 2017/0150231 A1 | 5/2017 | Brulotte |

* cited by examiner

MEDIA CONTENT DELIVERY SELECTION

CROSS-REFERENCES TO RELATED APPLICATIONS

This application is a continuation of U.S. patent application Ser. No. 14/945,454, filed on Nov. 19, 2015, entitled "Media Content Delivery Selection," the disclosure of which is hereby incorporated by reference in its entirety for all purposes.

BACKGROUND

Media content such as videos, television programming, movies, sporting events, and the like, may be delivered from a variety of sources, e.g., a conventional cable television or satellite network, a computer server connected to the Internet, etc. Further, users within customer premises may access media content via a variety of devices, e.g., a television connected to a set top box, a laptop, desktop, or tablet computer, etc.

Often, a media content source provides access to media content according to categories to which items of media content are assigned. For example, media content items may be accessed by selection of the television channel, a genre, a subscription level (e.g., basic or premium), etc. In some instances, the media content provider may wish to make a particular category or categories of media content, e.g., a premium channel, available to users on a temporary and/or promotional basis. That is, the media content provider may make available to one or more users a category of media content to which the user has not subscribed or otherwise obtained access. However, with the goal of getting the user to access the media content and/or category of media content, the media content provider faces the challenge of getting the user to access, and hopefully purchase, the media content and/or category of media content.

DRAWINGS

DETAILED DESCRIPTION

Introduction

Figure 1:
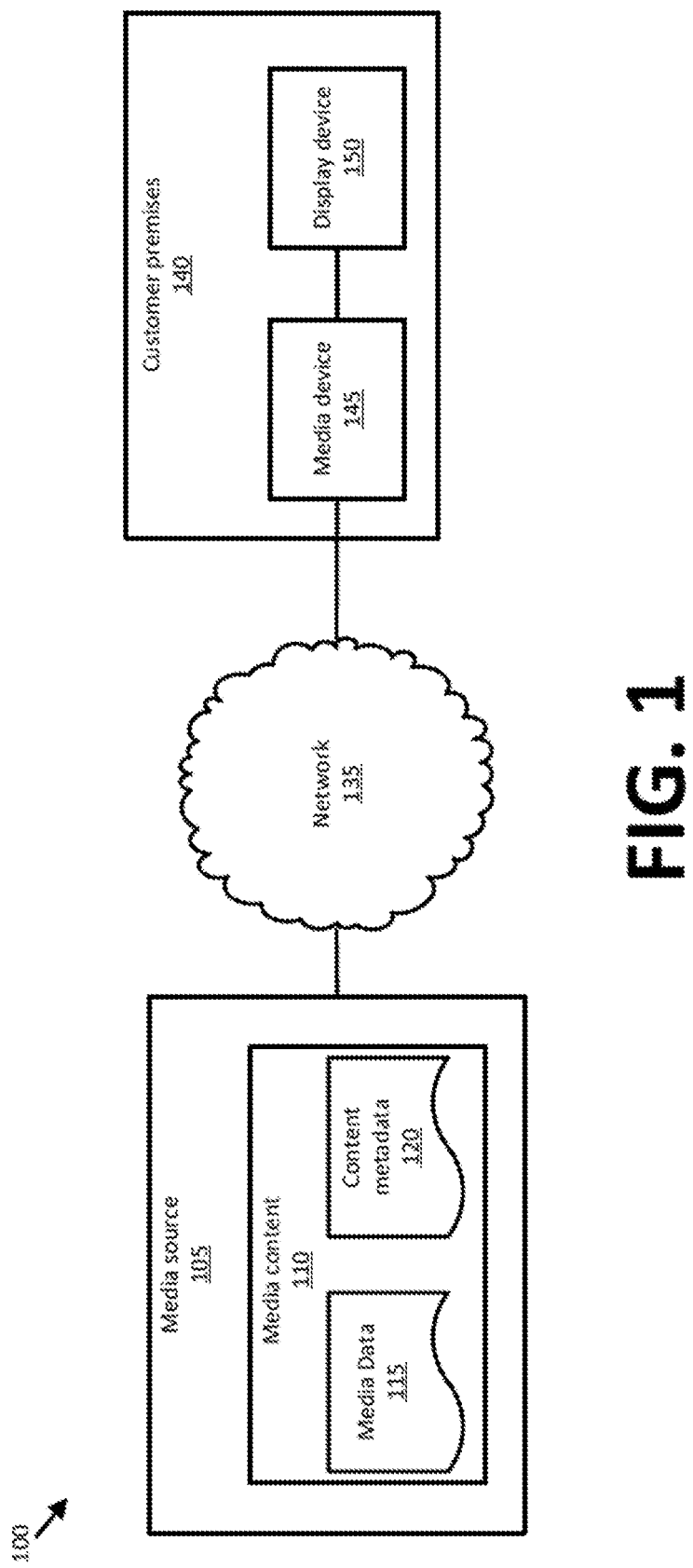
FIG. 1 is a block diagram of an exemplary media content delivery system.

FIG. 1 is a block diagram of an exemplary media content delivery system 100. A media source 105 in the system 100 includes media content 110, e.g., streaming content, examples of an item of content 110 including a video presentation such as a movie, television program, sporting event, video clip, etc. Further, the media source 105 may organize areas items of media content 110 according to channels, or other categories, e.g., genre, subscription level (e.g., basic or premium), rating, etc. The media content 110 may be provided in a known manner, e.g., via a network 135 to a media device 145 that is generally located in a customer premises 140.

As discussed further below, media content 110 is generally provided with metadata 120, including an indication of a category and/or an indication that a category of media content 110 is to be displayed, substantially immediately, upon activation of a display and without user input to select an item of media content 110 for display. For example, a premium channel that the media source 105 has made available to users not subscribing to the premium channel as part of a promotion could be indicated in the metadata 120. A media device 145 in a customer premises 140 is programmed to recognize the indication of a category in the metadata 120, and to actuate display of media content 110 in one or more categories pre-stored in a memory of the media device 145. Content 110 in such predetermined categories is sometimes referred to herein as "selected content 110." Continuing the previous example, the media device 145 could, upon activation of a display, e.g., a powering up of the media device 145 and/or associated display device 150, cause display of an item of selected media content 110 being provided according to the indicated category.

Exemplary System Elements

Media Source

In general, media source 105 may include various known elements in various known arrangements for processing, storing, and providing media content 110 and related data. Elements of the media source 105 may be local to one another and/or may be distributed amongst multiple locations. For example, media source 105 may include one or more computer servers (some or all of which may be referred to as "media servers") and data storage devices, e.g., for storing and processing content 110 and other data such as discussed herein.

In general, the media source 105 may be any one or some combination of various mechanisms for delivering media content 110, e.g., one or more computing devices and storage devices, and may depend on a type of media content 110 being provided. By way of example and not limitation, media content 110 data may be provided as video-on-demand through a cable, satellite, or internet protocol television (IPTV) distribution system, as streaming Internet video data, or as some other kind of data. Accordingly, the media source 105 may include one or more of a cable or satellite television headend, a video streaming service such as generally includes a multimedia web server (or some other computing device), or some other mechanism for delivering multimedia data. In general, examples of media content 110 include various types of data, including audio, video, images, etc.

Media content 110 is generally delivered via the network 135 in a digital format, e.g., as compressed audio and/or video data. The media content 110 generally includes, according to such digital format, media data 115 and media metadata 120. For example, MPEG refers to a set of standards generally promulgated by the International Standards Organization/International Electrical Commission Moving Picture Experts Group (MPEG). H.264 refers to a standard promulgated by the International Telecommunications Union (ITU). Accordingly, by way of example and not limitation, media content 110 may be provided in a format such as the MPEG-1, MPEG-2 or the H.264/MPEG-4 Advanced Video Coating standards (AVC) (H.264 and MPEG-4 at present being consistent), or according to some other standard or standards. For example, media content 110 could be audio data formatted according to standards such as MPEG-2 Audio Layer III (MP3), Advanced Audio Coding (AAC), etc. Further, the foregoing standards generally provide for including metadata, e.g., media metadata 120, along with media data 115, in a file of media content 110, such as the media metadata 120 discussed herein.

Media content 110 includes media content as it is usually provided for general distribution, e.g., a movie, television program, video file, audio file, etc. in a form has provided by a distributor of the media content 110. Alternatively or additionally, media content 110 may be modified from the form provided by a general distributor of content (e.g., recompressed, re-encoded, etc.). The media data 115 includes data by which a display, playback, representation, etc. of the media content 110 is presented on a media device 145 and/or display device 150. For example, media data 115 generally includes units of encoded and/or compressed video data, e.g., frames of an MPEG file or stream.

An item of media content 110 typically includes metadata 120 describing the item of media content. Media metadata 120 in media content 110 may include metadata as provided by an encoding standard such as an MPEG standard. Alternatively and/or additionally, media metadata 120 could be stored and/or provided separately to a media device 145, apart from media data 115. Further, in addition to metadata 120 included in a particular item of media content 110, the media device 145 could receive metadata not included in media content 110, e.g., metadata provided to a set-top box media device 145 identifying a category such as a programming channel or the like. In one example, the media device 145 receives a table or tables form the media source 105 that specifies, for each available item of media content 110 at a particular time, channels associated with each available item of media content 110

Accordingly, the media device 145 may be programmed to associate the category with media content 110 items included therein, e.g., provided in the programming channel. Yet further, metadata 120 for a media content item 110 could include an identifier for a category of items of media content 110, the category identifier possibly being associated with delivery of a programming channel or the like, such as is known, to the media device 145 and/or being included in metadata 120 for an item of media content 110. As explained above, a category identifier may indicate various categorizations of media content 110 e.g., channels of programming, genres, subscription levels, etc.

Further, as noted above, media metadata 120 for an item of media content 110 generally provides various descriptive information for the item of media content 110. Examples of media metadata 120 include information such as content 110 title, chapter, actor information, Motion Picture Association of America MPAA rating information, reviews, and other information that describes an item of media content 110. Information for metadata 120 may be gathered from a content producer, e.g., a movie studio, media information aggregators, and other sources such as critical movie reviews.

Network

Communications to and from the media source 105, customer premises 140, and possibly other sites may occur via the network 135. In general, the network 135 represents one or more mechanisms for delivering content 110 from the media source 105 to a media device 145. Accordingly, the network 135 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks, local area networks (LAN) and/or wide area networks (WAN), including the Internet, etc.

Customer Premises

Turning to the customer premises 140, the media device 145 is generally a device including a computer processor and associated storage, e.g., volatile memory, nonvolatile memory, etc., and capable of communicating via the network 135. Exemplary media devices 145 include a set-top box, a personal computer such as a laptop, handheld, or tablet computer, a smart phone, etc.

The media device 145 may include a display and/or may be connected to a display device 150, e.g., a television, or may incorporate a display device 150, e.g., a display of a personal computer. When content 110 is referred to herein as being "displayed," it is to be understood that such display could include any possible mode of displaying media data, such as a display of visual data, audio data, etc. For example, content 110 could be displayed by showing video or image data on a screen with or without sound, by playing audio data with or without a visual display, etc.

The media device 145 is typically programmed to receive media content 110, including content data 115 and metadata 120 for an item of media content 110, and to interpret the metadata 120, e.g., in a known manner. For example, the media device 145 could be a set top box or the like, and could include programming to identify one or more channels of content 110 as is known. Further, the media device 145, e.g., a set-top box, could include programming to automatically tune, e.g., in a known manner, to a channel of media content 110 identified with a category indicated, e.g., in metadata 120, to have a priority status for display, e.g., to be promotional content. Yet further, the media device 145 could include programming to for display, e.g., to be provided to a display 150 such as a television, when the media device 145 is activated to display media content 110, e.g., when a set-top box is powered up from a standby mode to an active mode as is known. Advantageously, a user may thereby be provided with media content 110 associated with a category, e.g., a channel, that a provider of the media content 110 wishes to promote or to otherwise expose to the user.

Exemplary Process

Figure 2:
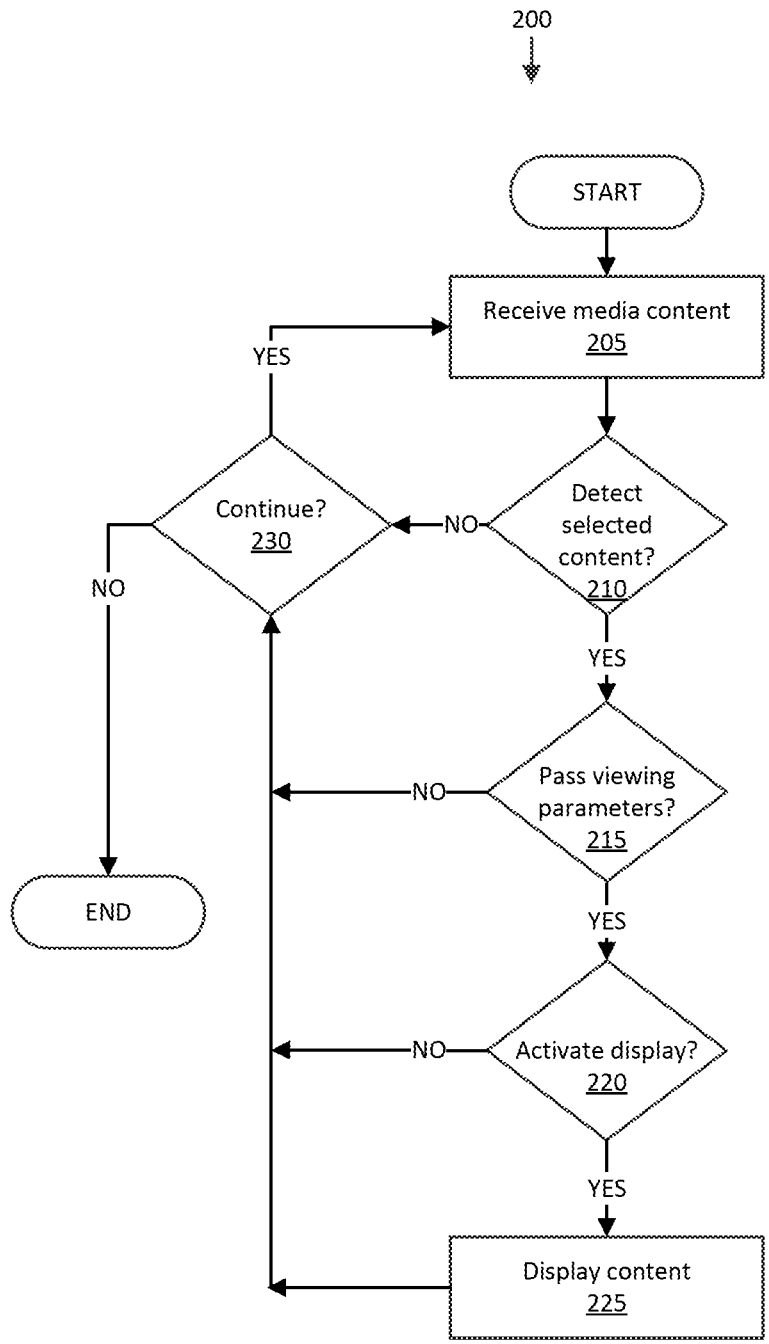
FIG. 2 is diagram of an exemplary process for detecting and displaying selected media content.

FIG. 2 is a diagram of an exemplary process 200 for detecting and displaying selected media content 110. The process 200 may be executed according to program instructions stored in a memory of the media device 145, e.g., a memory of a set-top box, personal computing device, etc.

The process 200 begins in a block 205 in which the media device 145 receives, from a media source 105, multiple items of media content 110. Typically, one or more, possibly all, of the items of media content 110 are associated with a category, such as a channel of programming or the like. Further, it will be understood that the media device 145 may receive only a portion of an item of media content 110, e.g., metadata 120. In any event, the media device 145 in the block 205 is typically in a standby mode or the like. For example, a set-top box is typically known to have a low-power standby mode in which the set-top box may receive data, e.g., metadata 120 indicating available channels of programming, from the media source 105.

Next, in a block 210, the media device 145 determines whether it has detected selected media content 110. As described above, the media device 145 typically stores in a memory and identifier or other indicator of one or more categories, e.g., a category being a programming channel or the like, of media content 110 that is to be provided to a display 150 upon activation of the display 150. The media device 145 may store a table or the like of available categories, e.g., programming channels, available to the user, e.g., to which the user has subscribed. Other categories may be indicated as available to the user as selected media content 110, e.g., the device 145 could be instructed by the media source 105 to store identifiers associated with one or more such categories, e.g., channels being promoted and therefore available to the user for a limited time, whereupon such category could be used by the media device 145 to provide access to, and to display, a category, e.g., programming channel, via the display 150. Upon detecting availability of a category of one or more categories of selected media content 110, the process 200 proceeds to a block 215. If no category of selected media content 110 is detected, then the process 200 proceeds to a block 230.

In the block 215, the media device 145 determines whether identified selected media content 110, e.g., according to a programming channel, a genre, etc., meets viewing parameters such as may be stored in a memory of the media device 145. For example, the media device 145 is known to store parental controls, user preferences, and the like. If an item of selected media content 110 is associated with a category stored in the memory of the media device 145, but does not meet viewing parameters stored in the media device 145 memory, e.g., violates parental control rules, then typically the media device 145 will be programmed to avoid display of the selected media content 110 even though the media content 110 is associated with a stored category, and the process 200 proceeds to the block 230. However, if at least one of the one or more selected media content 110 items identified in the block 210 meets viewing parameters stored by the media device 145, then a block 220 is executed next.

In the block 220, the media device 145 determines whether input has been received to activate the display 150. As one example of activation of the display 150, a set-top box or the like could be powered up from a standby mode to a full power or viewing mode, possibly along with a television or other display device 150. Alternatively, an application, i.e., a computer program, running on a laptop, desktop, tablet, etc., computer media device 145 including programming to receive media content 110 from the media source 105 and to provide the media content 110 to a display 150, e.g., a computer screen, could be brought from a background state to a foreground state. That is, the program could be minimized, or running as a background process not visible to the user but started by the computer 145 operating system and then brought to what is referred to as a foreground state upon user input, e.g., maximizing an application window, providing input, e.g., selecting an icon or the like, to instantiate an interface of the application for user interaction. In any event, if input is received to actuate the display device 150, then the process 200 proceeds to a block 225. Otherwise, the process 200 proceeds to the block 230.

In the block 225, the media device 145 provides an item of selected media content 110 to the display 150. Because the media device 145 could identify multiple items of selected media content 110 in the block 210, e.g., more than one channel of programming could be identified for a promotion at a given time, and further because more than one item of selected media content 110 could pass viewing parameters in the block 210, the media device 145 may need to choose one of multiple items of selected media content 110 to provide to the display 150. Accordingly, the media device 145 may be programmed to rank categories and/or items of media content 110 for provision to the display 150.

For example, a memory of the media device 145 may store a list of programming channels to be identified for selected media content 110, along with an order of priority for display of each of the channels. In this example, the media device 145 would simply select from a highest-ranked channel to choose one of multiple items of selected media content 110. In another example, the media device 145 could use some other criterion, e.g., channel numbers, and alphabetical order of channels, etc. In yet another example, a criterion could include an expiration date for selected media content 110, e.g., where a promotion of a particular programming channel ends on a certain date, that date could be assigned as an expiration date, and channels with earlier expiration dates could be given a higher priority.

In any case, the process 200 exits the block 225 when display of the selected media content 110 ends or stopped, and then, following the block 225, the process 200 proceeds to the block 230.

In the block 230, the media device 145 determines whether the process 200 continues. For example, the media device 145 could be powered totally off, rather than a set-top box running in standby mode, computing device running a media display application in the background, etc., in which case the process 200 ends. However, if the process 200 continues, that is, the media device 145 remains active to receive information via the network 135 from the media source 105, then the process 200 returns to the block 205.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A media device comprising:
   one or more processors; and
   a non-transient memory having processor-readable instructions stored thereon, which, when executed, cause the one or more processors to perform steps comprising:
      receiving, while the media device is in a low-power standby mode and a display device is not activated, multiple items of media content from a media content provider over a provider network, the multiple items of media content each including metadata that indicates a predefined category associated with subscription media selected by the media content provider to be made accessible to a user of the media device promotionally despite the user not subscribing to the media content;
      storing the multiple items of media content along with an order of priority;
      identifying, responsive to powering up of the media device from the low-power standby mode, a selected media content as a highest priority one of the multiple items of media content to be displayed upon activation of the display device based on the metadata indicating the predefined category and the order of priority; and
      providing the selected media content to the display device to be displayed substantially immediately upon activation of the display device and without user input to select an item of media content for display.

2. The media device of claim 1, wherein:
   the processor-readable instructions, when executed, cause the one or more processors to perform steps further comprising storing the selected media content upon receipt from the provider network in the non-transient memory; and
   the providing comprises retrieving the selected media content from the non-transient memory.

3. The media device of claim 1, wherein:
   the receiving comprises receiving a plurality of media content while the media device is in a low-power standby mode;
   first media content of the plurality of media content is the selected media content, the metadata being first metadata that indicates the predefined category; and
   second media content of the plurality of media content is not the selected media content and includes second metadata that indicates a second category other than the predefined category,
   such that the first media content is provided to the display device to be displayed substantially immediately upon activation of the display device and without user input to select an item of media content for display.

4. The media device of claim 3, wherein the processor-readable instructions, when executed, cause the one or more processors to perform steps further comprising:
   receiving, subsequent to the providing the selected media content to the display device, user input to select the second media content for display; and
   providing the second media content to the display device to be displayed responsive to the receiving the user input to select the second media content for display.

5. The media device of claim 1, wherein the activation of the display device comprises powering up the display device from a standby mode.

6. The media device of claim 1, wherein:
   the display device is a display application running on a computer;
   the display application is not activated by running in a background state not visible to the user; and
   the activation of the display device comprises bringing the display application from the background state to a foreground state visible to the user.

7. The media device of claim 1, wherein:
   the identifying further comprises determining whether the selected media content passes one or more programming parameters; and
   the providing comprises providing the selected media content to the display to be displayed substantially immediately upon activation of the display only when the selected media content passes the one or more programming parameters.

8. The media device of claim 7, wherein the programming parameters include parental controls.

9. The media device of claim 1, wherein the predefined category indicates a channel of programming, a genre, and/or a subscription level.

10. The media device of claim 1, wherein the media device is a set-top box comprising a television receiver.

11. A method for providing display of selected media content substantially immediately upon activation of a display device, the method comprising:
   receiving, while a media device is in a low-power standby mode, multiple items of media content from a media content provider over a provider network, the multiple items of media content each including metadata that indicates a predefined category associated with subscription media selected by the media content provider to be made accessible to a user of the media device promotionally despite the user not subscribing to the media content;

storing the multiple items of media content along with an order of priority;

identifying, responsive to powering up of the media device from the low-power standby mode, a selected media content as a highest priority one of the multiple items of media content to be displayed upon activation of a display device based on the metadata indicating the predefined category and the order of priority; and providing the selected media content to the display device to be displayed substantially immediately upon activation of the display device and without user input to select an item of media content for display.

12. The method of claim 11, further comprising:
storing the selected media content upon receipt from the provider network in a memory of the media device,
wherein the providing comprises retrieving the selected media content from the memory.

13. The method of claim 11, wherein:
the receiving comprises receiving a plurality of media content while the media device is in a low-power standby mode;
first media content of the plurality of media content is the selected media content, the metadata being first metadata that indicates the predefined category; and
second media content of the plurality of media content is not the selected media content and includes second metadata that indicates a second category other than the predefined category,
such that the first media content is provided to the display device to be displayed substantially immediately upon activation of the display device and without user input to select an item of media content for display.

14. The method of claim 13, further comprising:
receiving, subsequent to the providing the selected media content to the display device, user input to select the second media content for display; and
providing the second media content to the display device to be displayed responsive to the receiving the user input to select the second media content for display.

15. The method of claim 13, wherein the activation of the display device comprises powering up the display device from a standby mode.

16. The method of claim 13, wherein:
the display device is a display application running on a computer;
the display application is not activated by running in a background state not visible to the user; and
the activation of the display device comprises bringing the display application from the background state to a foreground state visible to the user.

17. The method of claim 13, wherein:
the identifying further comprises determining whether the selected media content passes one or more programming parameters; and
the providing comprises providing the selected media content to the display to be displayed substantially immediately upon activation of the display only when the selected media content passes the one or more programming parameters.

18. The method of claim 17, wherein the programming parameters include parental controls.

19. The media device of claim 1, wherein:
each of the multiple items of media content is associated with an expiration date; and
the order of priority is based on the expiration date, such that those of the multiple items of media content having an earlier expiration dates are ordered with a higher priority.

* * * * *